US005819909A

United States Patent [19]

Boller et al.

[11] Patent Number: 5,819,909

[45] Date of Patent: Oct. 13, 1998

[54] APPARATUS FOR RECEIVING AND TRANSPORTING FLAT ARTICLES

[75] Inventors: Manfred Boller, Hohentengen; Wilhelm Maier, Wettigen, both of Germany

[73] Assignee: Grapha-Holding AG, Hergiswil, Switzerland

[21] Appl. No.: 732,996

[22] Filed: Oct. 16, 1996

[30] Foreign Application Priority Data

Oct. 17, 1995 [CH] Switzerland .......................... 02942/95

[51] Int. Cl.$^{6}$ .................................................... B65G 17/34

[52] U.S. Cl. ...................................... 198/803.15; 198/703

[58] Field of Search .............................. 198/803.15, 701, 198/703, 712, 713

[56] References Cited

U.S. PATENT DOCUMENTS 3,915,293 10/1975 Melchiorre et al. ........... 198/803.15 X
4,475,646 10/1984 Waas .............................. 198/803.15 X

FOREIGN PATENT DOCUMENTS

0638501A1 2/1995 European Pat. Off. .
1296099 3/1969 Germany .......................... 198/803.15
2207135 5/1981 Germany .......................... 198/803.15

*Primary Examiner*—James R. Bidwell
*Attorney, Agent, or Firm*—Spencer & Frank

[57] ABSTRACT

An apparatus for receiving and transporting flat articles respectively supplied by an overhead loader includes a conveying device comprising a first traction mechanism and transport containers attached to the first traction mechanism. The transport containers have intake openings facing in a direction of the overhead loader for receiving the flat articles from above the conveying device. A guide arrangement is disposed above the conveying device and includes an endlessly rotating second traction mechanism and a plurality of guide elements attached to the second traction mechanism. The guide elements move in the same direction as the conveying direction of the transport containers and approximately parallel to the intake openings of the transport containers. The guide elements are interspersed in the trajectory of the flat articles from the loader into the transport containers.

16 Claims, 3 Drawing Sheets

APPARATUS FOR RECEIVING AND TRANSPORTING FLAT ARTICLES

CROSS-REFERENCE TO RELATED APPLICATION

This application claims the priority of Patent Application Serial No. CH 02942/95 filed in Switzerland on Oct. 17, 1995, the subject matter of which is incorporated herein by reference.

BACKGROUND OF THE INVENTION

The invention relates to a device for receiving and transporting flat articles such as mailing envelopes, packages, printing products and workpieces, which are supplied by a loader to transport containers that are attached to a moving traction mechanism of a conveying device and have intake openings that face the loader arranged above.

Such devices are used as distribution conveyors in post offices or in warehouses, where the articles flowing toward a collecting point must be distributed to points far away.

Moreover, these flat articles have irregular outside shapes and different degrees of stiffness, due in part to their varied contents, which place high demands on machine processing.

In post offices, devices of the above-described type are used, for example, for sorting mailing envelopes based on their mailing addresses. After the mailing addresses are acquired by the mail sorting equipment, the mailing envelopes are supplied to a loader, which turns the mailing envelopes over to the transport containers that are controlled to be coordinated with a certain supply station.

European patent application No. EP-A-0 638 501 discloses a device of the above type for continued transport of individually supplied flat articles, for which the transport containers have an upward facing intake opening for the articles supplied by an overhead loader.

Practical operations have shown that a reliable loading of the transport containers through their intake openings is not ensured due to the interspace between the loader and the intake opening of the transport containers, the varied characteristics of the conveyed articles and the relatively high conveying speed which affects the reliability of such devices in a negative way.

SUMMARY OF THE INVENTION

It is therefore an object of the invention to create a device of the aforementioned type with which the articles are reliably fed to the transport containers along the loading path in the correct position.

The above and other objects are accomplished in accordance with the invention by the provision of an apparatus for receiving and transporting flat articles respectively supplied by an overhead loader, comprising: a conveying device including a first traction mechanism and transport containers attached to the first traction mechanism for being moved in a conveying direction, the transport containers having intake openings facing in a direction of the overhead loader for receiving the flat articles from above the conveying device; and a guide arrangement disposed above the conveying device and including an endlessly rotating second traction mechanism and a plurality of guide elements attached to the endlessly rotating second traction mechanism, the guide elements moving in the same direction as the conveying direction, approximately parallel to the intake openings of the transport containers, and interspersing a trajectory of the flat articles from the loader into the transport containers.

The apparatus according to the invention makes it possible to achieve a high conveying capacity.

In accordance with a further feature of the invention it is advantageous if the guide elements are designed so that they become narrower, like a funnel, in the direction of trajectory of the flat articles from the loader to the transport containers. In this manner, the articles will reach the guide elements safely due to the initially wide intake opening of the guide element which then transitions to an adjoining path that presents a narrow trajectory.

According to another feature of the invention, the guide elements are fastened to the endlessly rotating traction mechanism at the same regular intervals as the transporting containers that follow one other, and the guide elements are driven in cycle with the transport containers. This eliminates the need for a special adjustment to place the guide elements and transporting containers in registration at the transfer place. That is, different intervals would require differentiated speeds and an adjustment of guide elements and transport containers at the area of transfer.

Preferably, the transport containers assume a tilting position away from the conveying direction of the conveying device which has the effect of optimizing or extending the transfer section at the area of transfer.

It is further preferable if the first traction mechanism to which the transporting containers are attached is formed by conveying chains which rotate endlessly around deflection rollers and are mounted at a distance to the sides of the transporting containers.

Conveying chains are particularly suitable for attaching the guide elements owing to the carrying axles at the side walls of the chain links of conveying chains.

In accordance with yet another feature of the invention, a further improvement in the operational safety and simplification can be achieved, as compared to known transport containers, by designing the transport containers to be closed on all sides and to have a flap-type or slide-type cover at the intake openings.

In order to ensure an essentially smooth transition between the guide elements and the transport containers in the transfer area, it is desirable that, during the loading operation, the downstream end of the slide at least approximately rests against the rear inside wall of the transport container as seen in conveying direction.

In order to stabilize the guide elements in the article transfer area, a side mounted transport chain guide, that extends over this area, can be provided.

These and other features and advantages of the invention will be further understood from the following detailed description of the preferred embodiments with reference to the accompanying drawings.

DETAILED DESCRIPTION OF THE PREFERRED EMBODIMENTS

Figure 1:
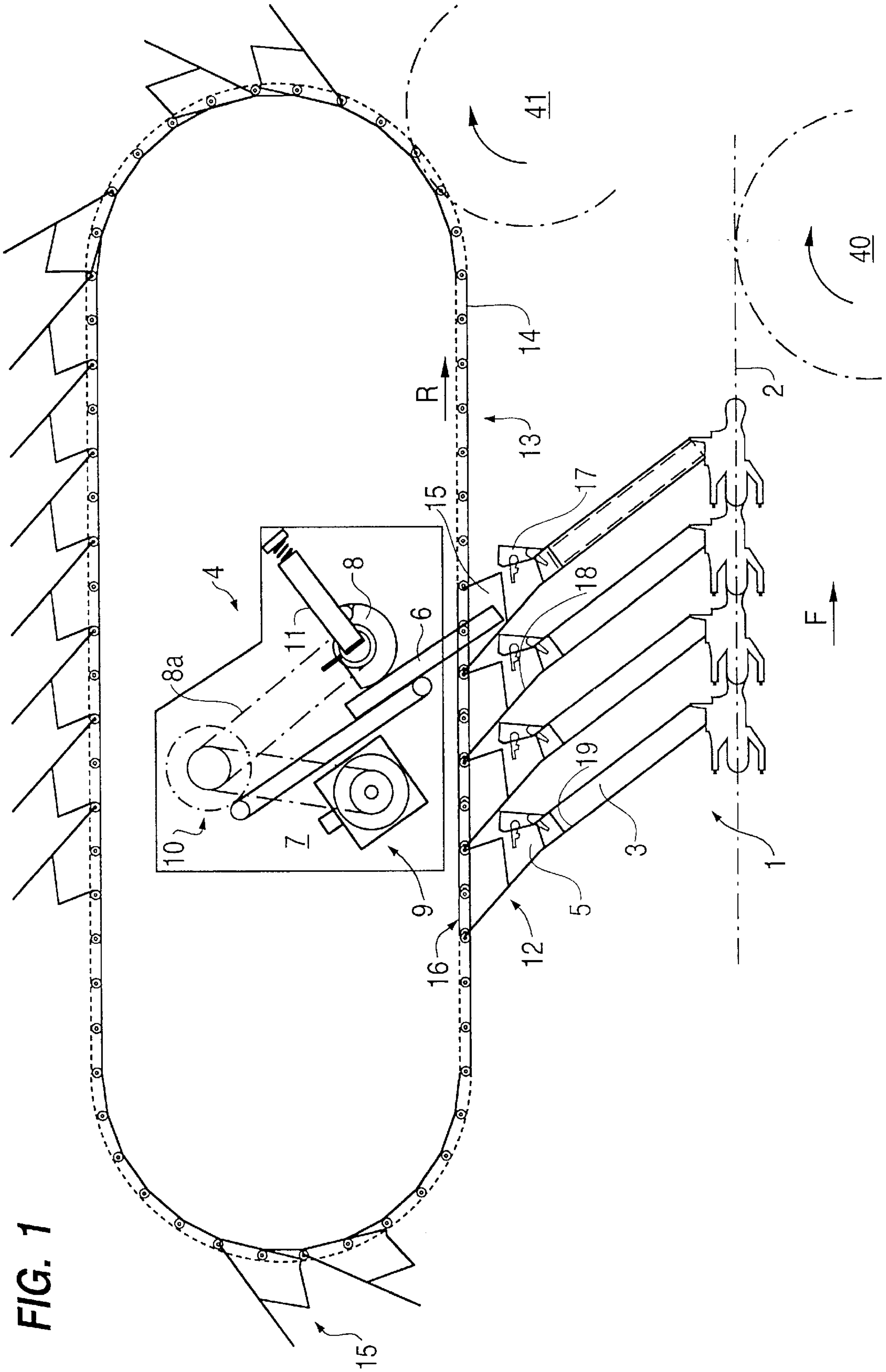
FIG. 1 is a side view of the apparatus according to the invention.

Referring to FIG. 1, there is shown a conveying device 1 with transporting containers 3, which are attached to a cyclically driven first traction mechanism formed, for example, by endlessly rotating conveying chains 2 represented by a dash-dot line in FIG. 1. The first traction mechanism is driven by a first drive means 40. Each transport container 3 has an intake opening 5 on its upper end that faces a loader 4, through which a flat article 6 is conveyed or falls from the loader 4 into the transport container 3. Articles 6 may comprise mailing envelopes, packages, printing products or other flat articles or workpieces, which are intended to be distributed from a collection place to various, distant locations, storage areas or workplaces or which are transported to other collection places. Transport containers are attached at regular intervals to traction mechanism 2 and assume a tilt position that is counter to the conveying direction F of conveying device 1 (i.e. the upper end with the intake opening leans back away from the direction of conveyance), so that the length of a loading segment of a transport container in conveying direction F can be optimized despite the compact arrangement.

Loader 4 passes along arriving articles 6 in cycle with conveying device 1 and may comprise, for example, a linear conveyor 7 that acts with surface friction upon one main surface of a product 6 in order to transfer the product to transport containers 3, and a conveying rotor 8 that is driven around an axle that is perpendicular to the conveying direction of linear conveyor 7. Conveying rotor 8 has a roll-off area whereby its circumferential surface rolls with friction on the facing surface of an article 6 during a transfer of the article to a transport container. Loader 4 is driven by a motor 9 connected over gear 10 which drivingly engages linear conveyor 7 which is in the form of a conveying belt. A further belt **8*a* between roll 10 and conveying rotor 8 drives conveying rotor 8. A preliminary tensioning device 11 ensures a correct contact pressure of conveying rotor 8 on article 6** as disclosed, for example in Swiss Patent Application No. 2501/95.

In order to avoid a non-guided conveying path between the loader 4 and conveying device 1 or a transport container 3, the invention at hand provides a guide arrangement 12, which limits the conveying path on the sides of articles 6. This guide arrangement 12 consists of a second traction mechanism 13, which is driven by a second drive means 41 such that it rotates above transport containers 3 in the same direction as the conveying direction F of conveying device 1. Traction mechanism 13 is formed by two parallel transporting chains 14, to which individual guide elements 15 are fastened at the same intervals as the transport containers 3 installed on the traction mechanism for conveying device 1 and which intersperse the trajectory or conveying path of articles 6 between loader 4 and transport containers 3. Conveying chains 2 and transporting chains 14 each have parallel belt runs which form a transfer section in one stretch. Due to the fact that the distances between transporting containers 3 attached to conveying chains 2 are the same as the distances between guide elements 15 at transporting chain 14, they move jointly with the same speed.

Figure 2:
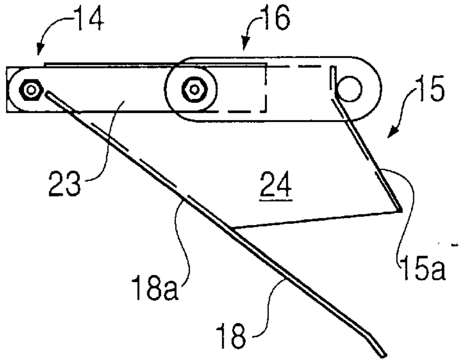
FIG. 2 is an enlarged end view of the guide arrangement shown in FIG. 1 in an area of one guide element.
Figure 3:
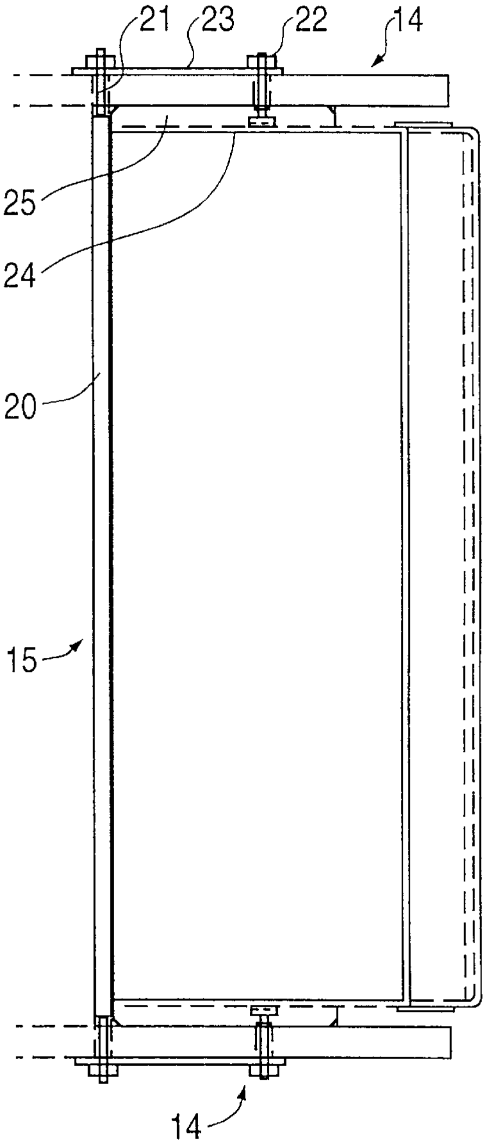
FIG. 3 is a view from above of FIG. 2.
Figure 4:
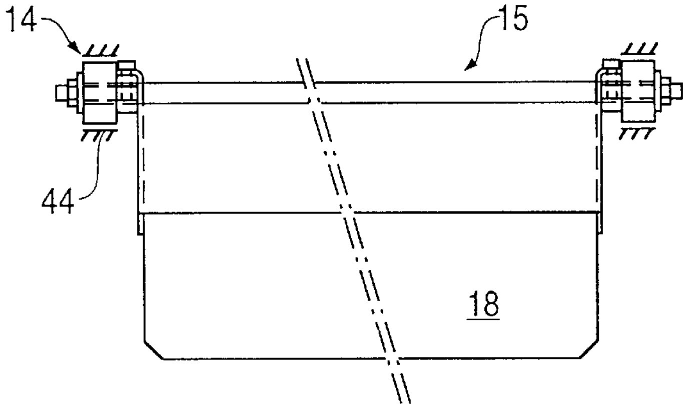
FIG. 4 is a side view of FIG. 2.

Referring additionally to FIGS. 2–4, there is shown a guide element 15 including a front wall **15*a*, a rear wall 18*a* having a downstream end forming a slide 18, and side walls 24 which together present a funnel shape having an intake opening 16 at the top and being partially open in a bottom region adjacent slide 18 as shown in FIG. 2. The funnel-shape is aligned with the trajectory direction of an article 6. Intake opening 16 of guide element 15 is enlarged as compared to the intake opening 5 of transport containers 3 in conveying direction F. This makes it easier to collect articles 6 and defines the trajectory of an article 6 more precisely through a subsequent narrowing of the trajectory toward the intake opening of a transport container. (To stabilize the quide elements 15 in the article transfer area, there can be provided a side mounted transport chain guide 44**, that extends over this area.)

As shown in FIGS. 1 and 5–7, intake openings 5 of transport containers 3 each have a flap-type cover 17, which forms a part of the guide when it is open. The partially open bottom region of funnel-shaped guide element 15 is nearly restored by cover 17 in the open position.

In an alternative embodiment, a sliding cover could be mounted over the intake opening of the transport containers in place of the flap-type cover.

The position of slide 18 at guide element 15 is arranged so that the downstream free end of slide 18 approximately rests against the rear inside wall 19 of transport container 3 in conveying direction F during a loading operation, and thus does not form a disrupting step or disadvantageous narrowing down of intake opening 5 of the transport container.

FIGS. 2 to 4 additionally illustrate the design of a guide element 15 and its attachment to traction mechanism 13 which is formed by two transporting chains 14. FIG. 2 shows funnel-shaped guide element 15 in a loading position. Guide element 15 is fastened on each side to a respective chain 14 by, on the one hand, a connecting rod 20 connected to a swiveling axle 21 of a chain link 23, and on the other hand, a connection between side wall 24 and another swiveling axle 22 of chain link 23. As a result, the movement of the chain links of transporting chains 14 is not limited. In order to reinforce the connection with transporting chains 14, a rail 25 is fastened to each side wall 24 of guide element 15.

Figure 5:
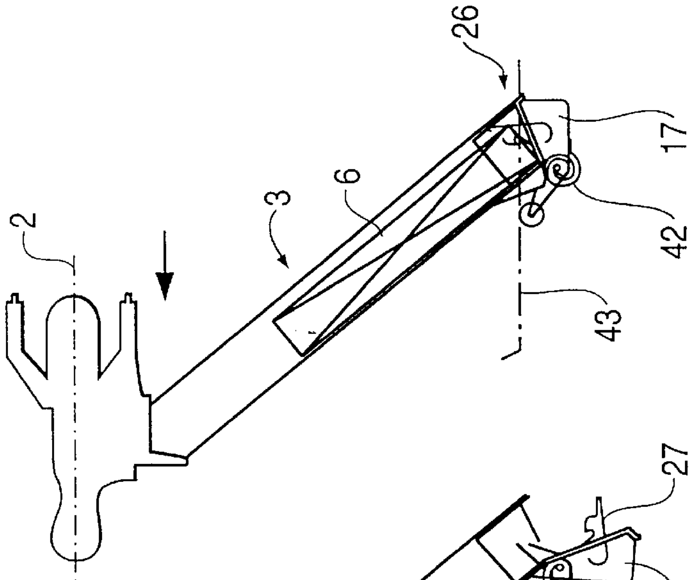
FIG. 5 is a side view of a closed transport container in the transporting position.
Figure 6:
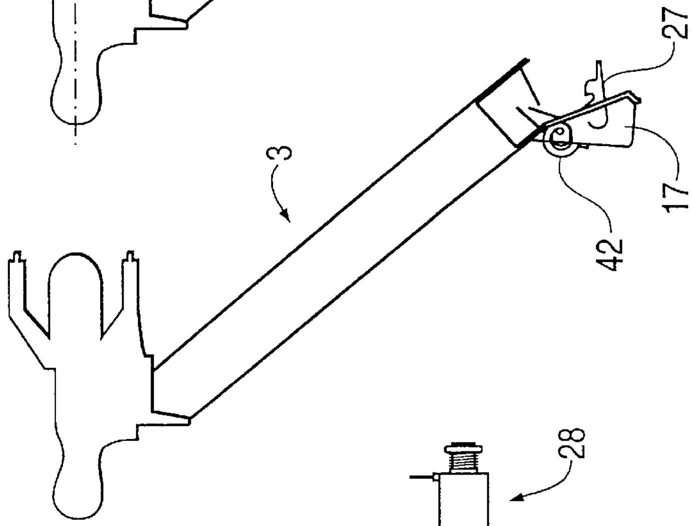
FIG. 6 is a side view of an open transport container in the emptying position.
Figure 7:
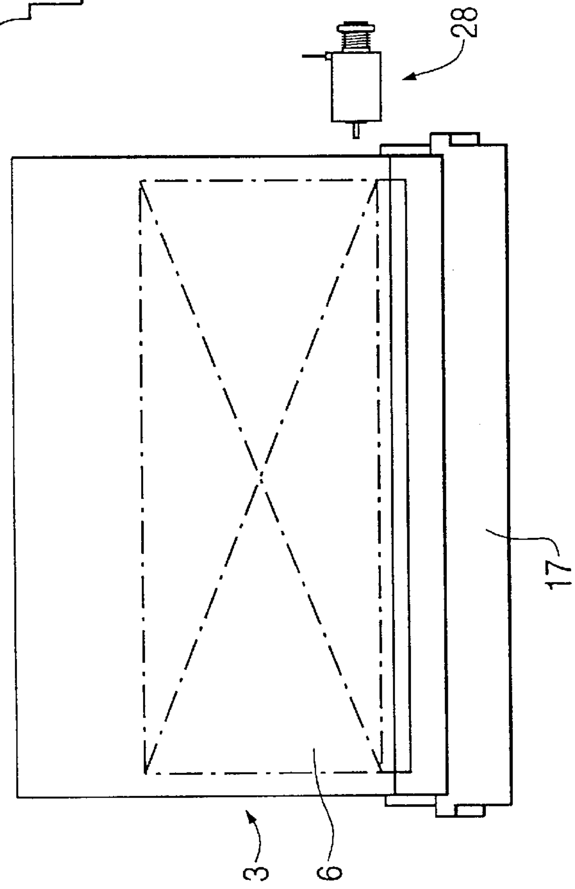
FIG. 7 is a plan view of an open transport container in the conveying direction.

FIGS. 5 to 7 show transport container 3 in different positions. FIG. 5 shows the still closed transport container 3, which has changed its position as opposed to the loading position by about 180° . An article 6 is shown near the cover and leaves the transport container 3 as soon as the cover 17 is opened as illustrated in FIG. 6. While transport container 3 is closed, cover 17 is held in place by a locking mechanism 26, for which the locking bar 27 is removed from the locking mechanism at the right moment by an unlocking mechanism 28, as shown in FIG. 7. In order to open transport container 3, cover 17 is swiveled by a torsion spring 42. Cover 17 is closed once more against the force of the torsion spring by, for example, a cam 43.

It will be understood that the above description of the present invention is susceptible to various modifications, changes and adaptations, and the same are intended to be comprehended within the meaning and range of equivalents of the appended claims.

What is claimed is:

1. An apparatus for receiving and transporting flat articles respectively supplied by an overhead loader, comprising:

a conveying device including a first traction mechanism and transport containers attached to the first traction mechanism for being moved in a conveying direction, the transport containers having an upper end including intake openings facing in a direction of the overhead loader for receiving the flat articles from above the conveying device; and a guide arrangement disposed above the conveying device and including an endlessly rotating second traction mechanism and a plurality of guide elements attached to the second traction mechanism, the guide elements being movable by the second traction mechanism in the same direction as the conveying direction and forming an approximately parallel transfer section above the first traction mechanism with the transport containers, on which transfer section the guide elements penetrate a trajectory of the flat articles during a direct feeding of the flat articles from the loader into the transport containers.

2. The apparatus according to claim 1, wherein the guide elements have a funnel shape that narrows in a direction of the trajectory of the flat articles.

3. The apparatus according to claim 1, wherein the transport containers are successively attached to the first traction mechanism at regular intervals, and the guide elements are attached to the second traction mechanism at the same regular intervals as the successively attached transport containers; and the apparatus further includes first means for cyclically driving the first traction mechanism and second means for driving the second traction mechanism in cycle with the first traction mechanism.

4. The apparatus according to claim 1, wherein the transport containers are tilted in a position that is counter to the conveying direction of the conveying device.

5. The apparatus according to claim 4, wherein the guide elements have a guide surface with a downstream portion shaped as a slide.

6. The apparatus according to claim 5, wherein the slide has a downstream end that rests approximately against a rear inside wall of the transport container in the conveying direction during a loading operation.

7. The apparatus according to claim 1, wherein the guide elements have sides and the second traction mechanism comprises transporting chains mounted at a distance to the sides, respectively, of the guide elements.

8. The apparatus according to claim 7, wherein the transporting chains comprise chain links and carrying axles connecting the chain links, and the guide elements are arranged between the transporting chains and are connected through the side walls with the carrying axles for the chain links.

9. The apparatus according to claim 1, wherein each transport container includes a flap-type cover over the intake opening and is closed on all remaining sides.

10. The apparatus according to claim 9, wherein the transport container includes a spring that has a spring force that is used to open the flap-type cover and a cam which is arranged for closing the flap-type cover.

11. The device according to claim 1, wherein the guide arrangement includes a side-mounted transporting chain guide, at least in an area in which the flat articles are supplied to the transport containers.

12. An apparatus for receiving and transporting flat articles respectively supplied by an overhead loader, comprising:

a conveying device including a first traction mechanism and transport containers attached to the first traction mechanism for being moved in a conveying direction, the transport containers having an upper end including intake openings facing in a direction of the overhead loader for receiving the flat articles from above the conveying device, and the transport containers being tilted in a position that is counter to the conveying direction of the conveying device; and a guide arrangement disposed above the conveying device and including an endlessly rotating second traction mechanism and a plurality of guide elements attached to the second traction mechanism, the guide elements being movable by the second traction mechanism in the same direction as the conveying direction and approximately parallel to the intake openings of the transport containers and interspersing a trajectory of the flat articles from the loader into the transport containers.

13. The apparatus according to claim 12, wherein the guide elements have a guide surface with a downstream portion shaped as a slide.

14. The apparatus according to claim 13, wherein the slide has a downstream end that rests approximately against a rear inside wall of the transport container in the conveying direction during a loading operation.

15. An apparatus for receiving and transporting flat articles respectively supplied by an overhead loader, comprising:

a conveying device including a first traction mechanism and transport containers attached to the first traction mechanism for being moved in a conveying direction, the transport containers each having an upper end including an intake opening facing in a direction of the overhead loader for receiving the flat articles from above the conveying device, and each transport container includes a flap-type cover over the intake opening and is closed on all remaining sides; and a guide arrangement disposed above the conveying device and including an endlessly rotating second traction mechanism and a plurality of guide elements attached to the second traction mechanism, the guide elements being movable by the second traction mechanism in the same direction as the conveying direction and approximately parallel to the intake openings of the transport containers and interspersing a trajectory of the flat articles from the loader into the transport containers.

16. The apparatus according to claim 15, wherein the transport container includes a spring that has a spring force that is used to open the flap-type cover and a radial cam which is arranged for closing the flap-type cover.

* * * * *